(12) United States Patent
Beck

(10) Patent No.: US 10,208,772 B1
(45) Date of Patent: Feb. 19, 2019

(54) POSITION-DETERMINING ACTUATOR

(71) Applicant: Altec Industries, Inc., Birmingham, AL (US)

(72) Inventor: Aaron Beck, Kansas City, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 15/869,381

(22) Filed: Jan. 12, 2018

(51) Int. Cl.
*F15B 15/28* (2006.01)
*G01D 5/48* (2006.01)

(52) U.S. Cl.
CPC ......... *F15B 15/2807* (2013.01); *G01D 5/485* (2013.01)

(58) Field of Classification Search
CPC .......... G01V 3/32; G01R 33/20; A61B 5/055; G01N 24/00
USPC .......................... 324/200, 300, 301, 307, 309
See application file for complete search history.

(56) References Cited

U.S. PATENT DOCUMENTS

| | | | |
|---|---|---|---|
| 5,514,961 A | 5/1996 | Stoll et al. | |
| 6,617,972 B2* | 9/2003 | Takarada | G08B 21/0484 324/538 |
| 8,779,729 B2* | 7/2014 | Shiraishi | G01R 31/3606 320/155 |
| 9,987,900 B2* | 6/2018 | Farjoud | B60G 17/08 |
| 2012/0098518 A1* | 4/2012 | Unagami | G01R 22/066 324/74 |
| 2014/0163476 A1* | 6/2014 | Chevallier | A61M 5/326 604/198 |
| 2018/0021604 A1* | 1/2018 | Hansen | A62B 3/005 |

FOREIGN PATENT DOCUMENTS

EP 2270436 A1 1/2011

* cited by examiner

*Primary Examiner* — Giovanni Astacio-Oquendo
(74) *Attorney, Agent, or Firm* — Erise IP, P.A.

(57) ABSTRACT

A position-determining actuator includes a rod, a barrel, a wave detector, and a controller. The barrel at least partially surrounds a piston of the rod so as to define a cap-side void and allow the rod to telescope relative to the barrel. The wave detector is associated with the cap-side void and configured to read fluid pressure of a hydraulic fluid disposed in the cap-side void. The controller is configured to receive, from the wave detector, a pressure reading from within the cap-side void; analyze the pressure reading to determine an extension standing wave; and analyze the extension standing wave to determine an extension dimension of the cap-side void.

15 Claims, 8 Drawing Sheets

POSITION-DETERMINING ACTUATOR

BACKGROUND

1. Field

Embodiments of the invention relate to hydraulic cylinders and other actuators. More specifically, embodiments of the invention relate to the determination of a position or magnitude of elongation of the actuator.

2. Related Art

Utility workers utilize aerial devices, cranes, and other utility vehicles to perform numerous tasks. Utility vehicles typically include a boom assembly that aids in performing the task. Some utility vehicles are powered and moved by hydraulic or pneumatic cylinders.

Hydraulic cylinders, pneumatic cylinders, and other actuators are used for numerous purposes. These actuators may elongate a component, change an angle of separation between two components, rotate a component, pivot a component, and perform other functions. Currently, systems that monitor the extension of the hydraulic cylinder are expensive, inaccurate, and fragile. What is lacking in the prior art is a system that is self-contained, inexpensive, and reliable.

SUMMARY

Embodiments of the invention solve the above-mentioned problems by providing a position-determining actuator configured to determine an extension dimension (e.g., a degree or distance to which the actuator is extended) of the actuator. The determination is performed at least in part by identifying, via a wave detector such as a pressure transducer, standing waves within the hydraulic fluid, pneumatic gas, or other fluid. At least a portion of the standing wave is indicative of the extension dimension. Thus, by monitoring pressure readings from the wave detector, standing waves can be identified and the extension dimension calculated. Embodiments of the invention make cylinder extension sensing easier, more reliable, and more affordable. Some embodiments may also be configured to be installed on existing cylinders, including those in the field.

A first embodiment of the invention is directed to a position-determining actuator comprising a rod, a barrel, a wave detector, and a controller. The barrel at least partially surrounds a piston of the rod so as to define a cap-side void and allow the rod to telescope relative to the barrel. The wave detector is associated with the cap-side void and configured to read fluid pressure of a hydraulic fluid disposed in the cap-side void. The controller is configured to receive, from the wave detector, a pressure reading from within the cap-side void; analyze the pressure reading to determine an extension standing wave; and analyze the extension standing wave to determine an extension dimension of the cap-side void.

A second embodiment of the invention is directed to a position-determining actuator system comprising a wave detector and a controller. The wave detector is configured to be secured to a barrel of a hydraulic cylinder and to read fluid pressure of a hydraulic fluid disposed in a cap-side void of the hydraulic cylinder. The controller is configured to receive, from the wave detector, a pressure reading from within the cap-side void; analyze the pressure reading to determine an extension standing wave; and analyze the extension standing wave to determine an extension dimension of the cap-side void.

A third embodiment of the invention is directed to a method of determining the position of a hydraulic cylinder comprising: receiving, from a wave detector in contact with hydraulic fluid in the hydraulic cylinder, a pressure reading; analyzing the pressure reading to determine an extension standing wave; and analyzing the extension standing wave to determine an extension dimension of the hydraulic cylinder.

Additional embodiments of the invention are directed to a method of installing the pressure-determining actuator, a method of assembling the pressure-determining actuator, a method of actuating a position-determining actuator, or other such methods. Still other embodiments of the invention may be directed to a utility vehicle comprising a base, a boom assembly, and a position-determining actuator such as described above. Yet other embodiments of the invention may be directed to a boom assembly comprising a position-determining actuator.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
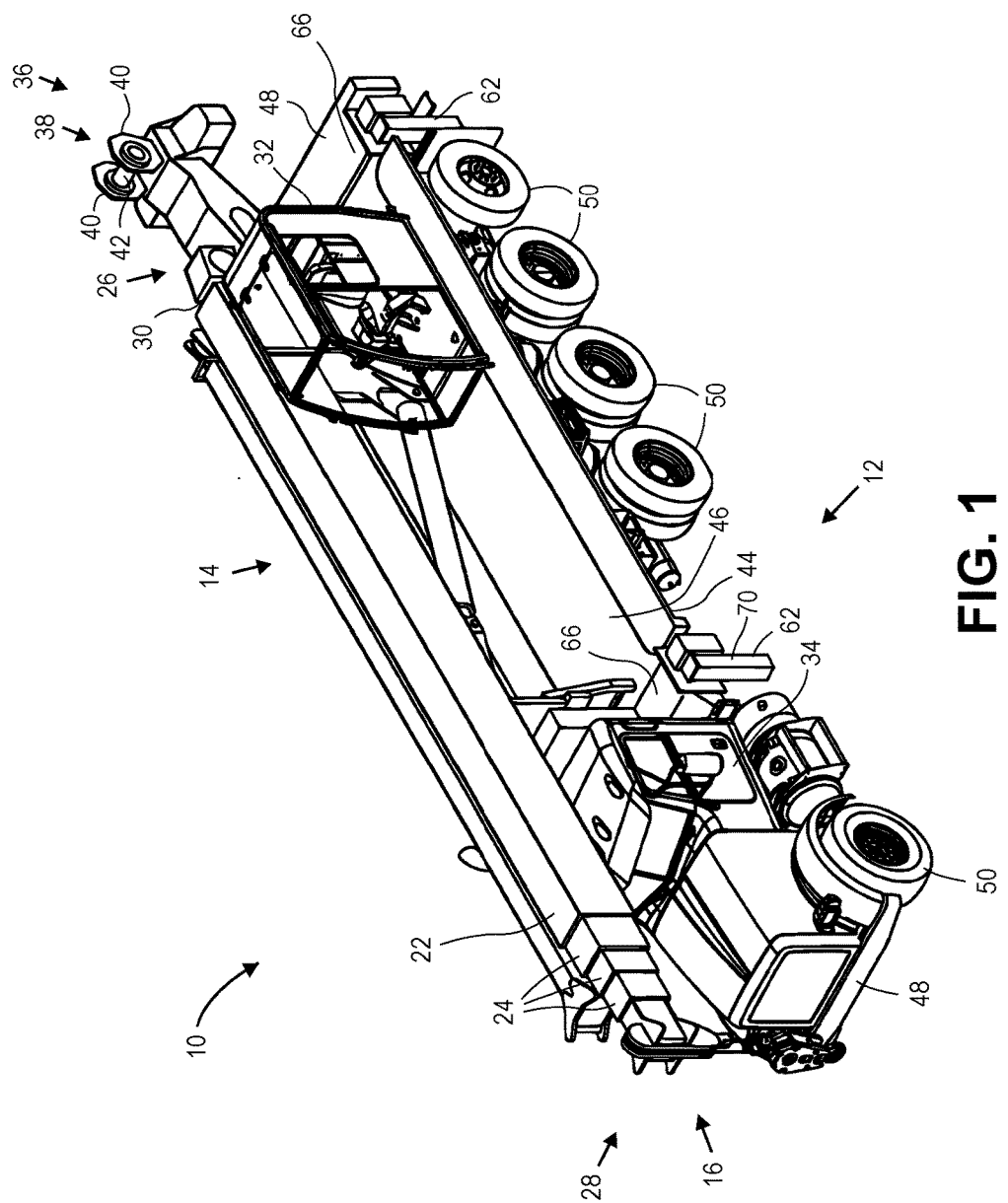
FIG. 1 is a perspective view of a utility vehicle with a set of outriggers in a stowed position, shown from a front left orientation.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

A utility vehicle 10 constructed in accordance with various embodiments of the invention, is shown in FIG. 1. The utility vehicle 10 generally comprises a base 12 with a boom assembly 14 rotatably mounted thereto. An implement 16 (such as a winch hook, a digger derrick, a pole guide, a utility platform, or other tool) is disposed on the boom assembly 14 to provide for the accomplishment of a task by a utility worker. The base 12 is stabilized by a set of outriggers 18. The set of outriggers 18 and/or the boom assembly 14 is controlled by a position-determining actuator 20 that is configured to move and determine the position of the set of outriggers 18 and/or the boom assembly 14 based upon an extension dimension determined through an analysis of standing waves within the position-determining actuator 20 (as discussed in much more detail below).

Before discussing the position-determining actuator 20 in detail, the other components of the utility vehicle 10 will be discussed so as to orient the reader as to a particular exemplary embodiment of the invention. The position-determining actuators 20 are each configured to move at least one component of the utility vehicle 10, such as those discussed below. It should also be appreciated that some embodiments of the invention are configured to be used on or with other devices.

The boom assembly 14 broadly comprises a lower boom section 22 and at least one upper boom section 24. The boom assembly 14 presents a proximal end 26 and a distal end 28. The proximal end 26 is rotatably and/or pivotably secured to a boom turret 30 of the base 12. The distal end 28 is secured to the implement 16. In some embodiments, the at least one upper boom section 24 is at least in part disposed within the lower boom section 22. The at least one upper boom section 24 telescopes to extend or retract into the lower boom section 22. In other embodiments, the upper boom section 24 pivots relative to the lower boom section 22. The pivoting boom section (not illustrated) does not telescope out of any other boom section. Instead the pivoting boom section rotates about the base 12, and the first boom section pivots and/or rotates relative to the pivoting boom section.

Figure 2:
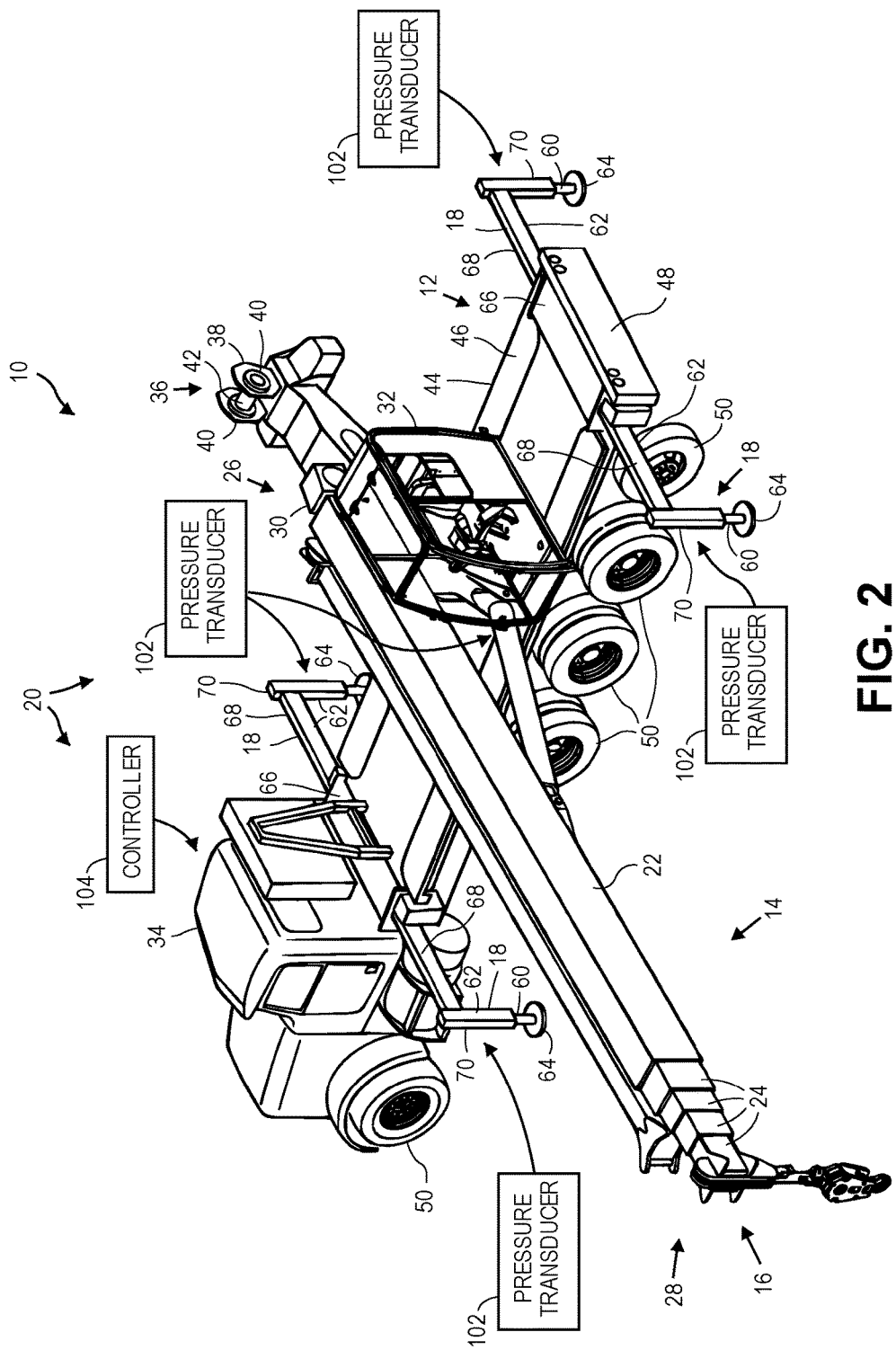
FIG. 2 is a perspective view of the utility vehicle of FIG. 1, shown with the set of outriggers in a deployed position and shown from a rear left orientation.
Figure 3:
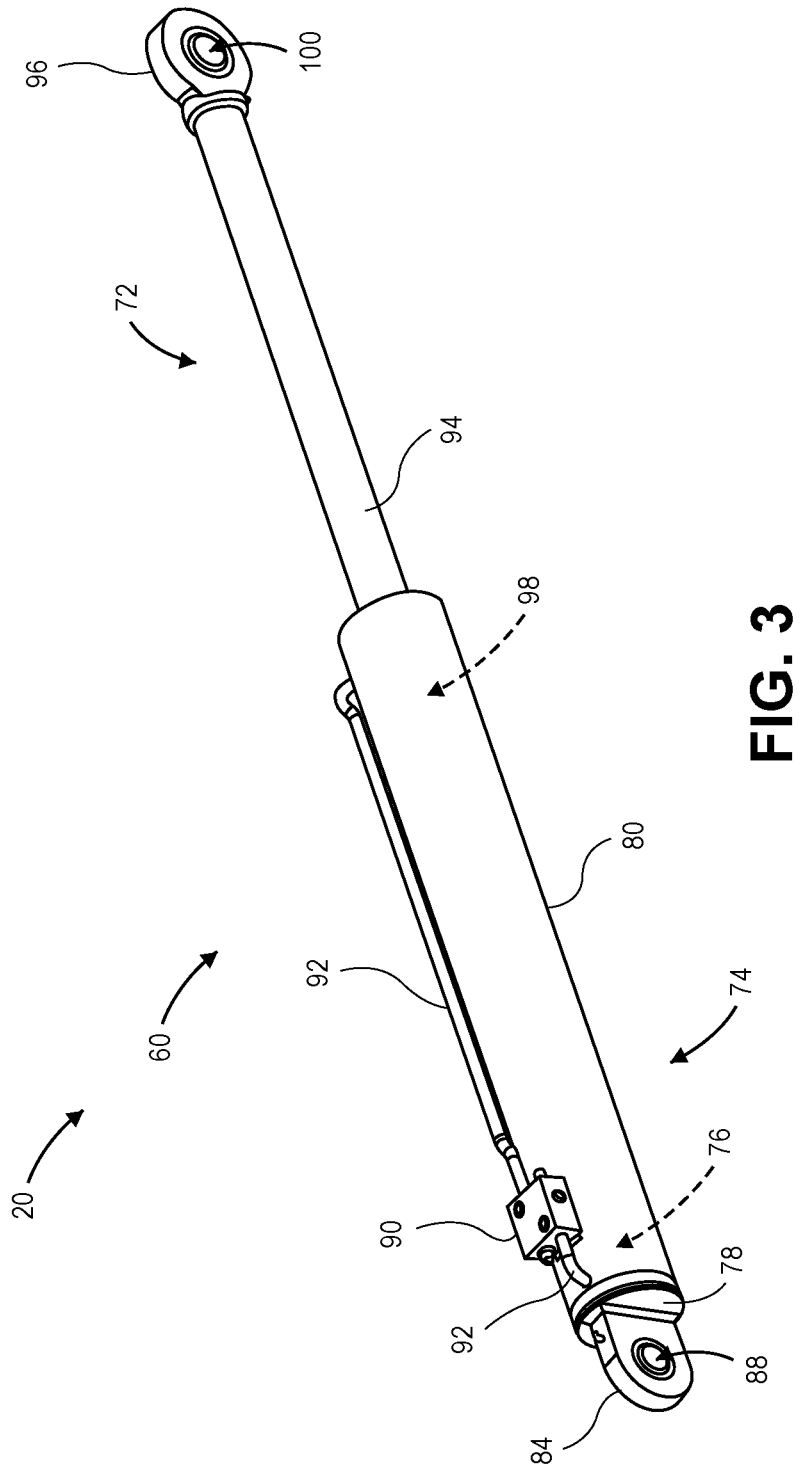
FIG. 3 is a perspective view of a position-determining actuator.

The proximal end 26 and/or the boom turret 30 may also have an associated static-operations cab 32 (as illustrated in FIGS. 1 and 2, but not present in FIG. 3). The static-operations cab 32 allows an operator to observe and control the operation of the boom assembly 14 while the utility vehicle 10 is stationary, with the set of outriggers 18 deployed (as discussed in detail below). A mobile operations cab 34 is utilized to drive or otherwise move the base 12 relative to the ground. The proximal end 26 of the boom assembly 14 may further comprise a winch 36 that is associated with a load line (not illustrated). The winch 36 includes a spool 38 and an associated hydraulic motor (not illustrated). The spool 38 includes two end caps 40 and a central section 42. The spool 38 rotates about a horizontal, lateral axis in response to actuation by the hydraulic motor. The load line is wrapped around the central section 42 of the first winch 36 and prevented from falling therefrom by the two end caps 40 of the winch 36.

The base 12 of the utility vehicle 10 is a selectively stabilized platform. In embodiments of the invention, the base 12 is an aerial device, a crane base, an oilrig, an earth-working machine, an automobile, or a fixed structure. The base 12 provides stability and a counterweight to a load being supported by the boom assembly 14. The base 12 includes a chassis 44, which presents a deck 46 at a deck level. The base 12 may also include one or more bumpers 48. The chassis 44 of the utility vehicle 10 is typically mobile and moves via wheels 50 rotatably secured to the base 12 below deck level.

The base 12 of the utility vehicle 10 utilizes at least one outrigger 18 for stabilization. In embodiments of the invention, such as illustrated in FIGS. 1-2, the outriggers 18 deploy from within, below, or alongside the base 12. The outriggers 18 are configured to be selectively placed into a stowed position (as shown in FIG. 1) and a deployed position (as shown in FIG. 2). When the outriggers 18 are in the stowed position, the utility vehicle 10 is free to maneuver via the wheels 50 because the outriggers 18 are not in contact with the ground. When the outriggers 18 are in the deployed position, the utility vehicle 10 is prevented from maneuver because the outriggers 18 are in contact with the ground. In some embodiments, the outriggers 18 lift the wheel 50 and/or track at least a portion off of the ground. This further prevents movement of the utility vehicle 10 and provides a more stable platform for the task to be performed.

In embodiments of the invention, the base 12 includes a plurality of outriggers 18, such as two, three, four, six, eight, etc. FIGS. 1-2 illustrated an exemplary base 12 with four outriggers 18, a front-left outrigger 52, a front-right outrigger 54, a rear-left outrigger 56, and a rear-right outrigger 58. In embodiments of the invention, the outriggers 18 are deployed from the base 12 in a shape (when viewed from above) that is substantially X-shaped, H-shaped, T-shaped, I-shaped, or other configuration. Relative to a forward driving direction, the outriggers 18 may deploy forward and backward, to the sides, at some intermediate angle therebetween (such as degrees, 45 degrees, 60 degrees relative to the forward/backward direction), etc.

One consideration during the determination of the layout of outriggers 18 relative to the base 12 is the size, shape, and weight distribution of the base 12. For example, if the base 12 is relatively long in the forward direction and relatively thin in the sideways direction, the outriggers 18 may deploy substantially perpendicular to the forward direction (i.e. the sideways direction). This is because the likelihood of the base 12 tipping forward or backward is reduced because of the relative length in the forward direction. A wide base 12 can therefore be achieved via a perpendicular deployment. As another example, if the base 12 is not substantially longer in the forward direction than in the sideways direction, the outriggers 18 may deploy in a diagonal direction relative to the forward direction, in a substantial X-shape when viewed from above. This is because the likelihood of the base 12 tipping forward or backward has not been reduced by the shape of the base 12.

The outrigger 18 will now be discussed in more detail. In embodiments of the invention the outrigger 18 is configured to be installed on and deployed by the utility vehicle 10. In some embodiments, the outriggers 18 are configured to be added to an existing utility vehicle 10. As such, the utility vehicle 10 may be upgraded with the outriggers 18 and/or boom assembly 14 that include or utilize the position-determining actuator 20 described below. In some embodiments, the outriggers 18 and/or boom assembly 14 that include or utilize the position-determining actuator 20 are configured to be originally manufactured with the utility vehicle 10.

The outrigger 18 comprises an actuator 60 (which may be the position-determining actuator 20 or a traditional hydraulic cylinder), an outrigger leg 62, an outrigger foot 64, and an outrigger base 66. The outrigger 18 is configured to be disposed into either a stowed position and a deployed position. The outrigger 18 is moved between the stowed position and the deployed position by the actuator 60. In some embodiments, the actuator 60 may operate in response to direct command from the operator, which may instruct or otherwise cause the actuator 60 to elongate or shorten. In other embodiments, the actuator 60 may operate in response to a certain mode or action being selected by the operator (such as preparing to move the boom assembly 14 or preparing to move the utility vehicle 10).

The actuator 60 is secured to the outrigger leg 62, the outrigger foot 64, and/or the outrigger base 66. The actuator 60 is configured to selectively place the outrigger 18 into the stowed configuration and the deployed configuration. Typically, the actuator 60 will shorten to place the outrigger 18 into the stowed configuration and elongate to place the outrigger 18 into the deployed configuration. The actuator 60 pushes and pulls against the outrigger leg 64 relative to the outrigger base 66 and/or the outrigger foot relative to the outrigger leg. In some embodiments, such as illustrated in FIGS. 1 and 2, the outrigger leg includes a horizontal segment 68 and a vertical segment 70 (commonly known as an "out and down" style). In these embodiments, the outriggers 18 may each include two actuators (an "out" actuator" and a "down" actuator), each of which may be at least partially disposed within the respective segments 68, 70. In these embodiments, the below discussed steps may be performed only in regard to the "down" actuator 60, or a combination thereof. In other embodiments, such as illustrated in FIG. 3, the outrigger leg 64 is a single monolithic structure including a single actuator 60.

The utility vehicle 10 may also utilize other actuators, such as controlling the rotation and/or rising of the boom assembly 14, controlling the telescoping of the boom assembly 14, controlling the pivoting of the pivoting boom section relative to another boom section, controlling the manipulation and orientation of the implement 16 at the distal end of the boom assembly 14, controlling the usage of the implement 16 at the distal end of the boom assembly 14, controlling a working jib, controlling a luffing jib, or performing other functions. As discussed above, embodiments of the invention are configured to determine the position of the actuator so as to provide a status indication to a computing device. This status may be provided as information to the utility worker, to determine when a certain command has been accomplished, to determine if the actuator is moving in an unexpected or undesired manner (such as via a slippage or other mechanical failure). Before discussing the operation of embodiments of the invention, the components of an exemplary actuator will be discussed so as to orient the reader to one such actuator which could utilize some embodiments of the invention.

Figure 5:
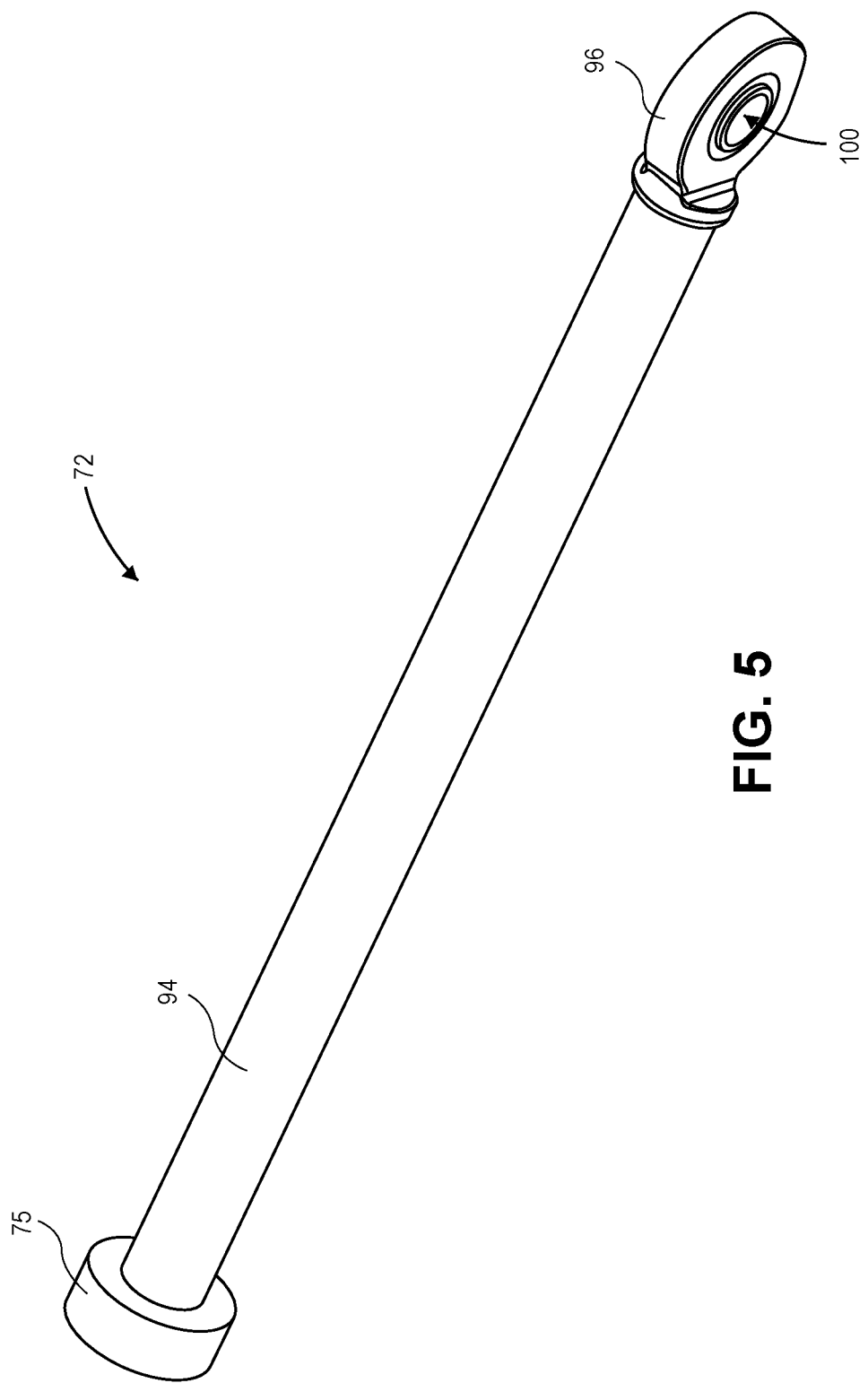
FIG. 5 is a perspective view of a rod and piston of the position-determining actuator.
Figure 7:
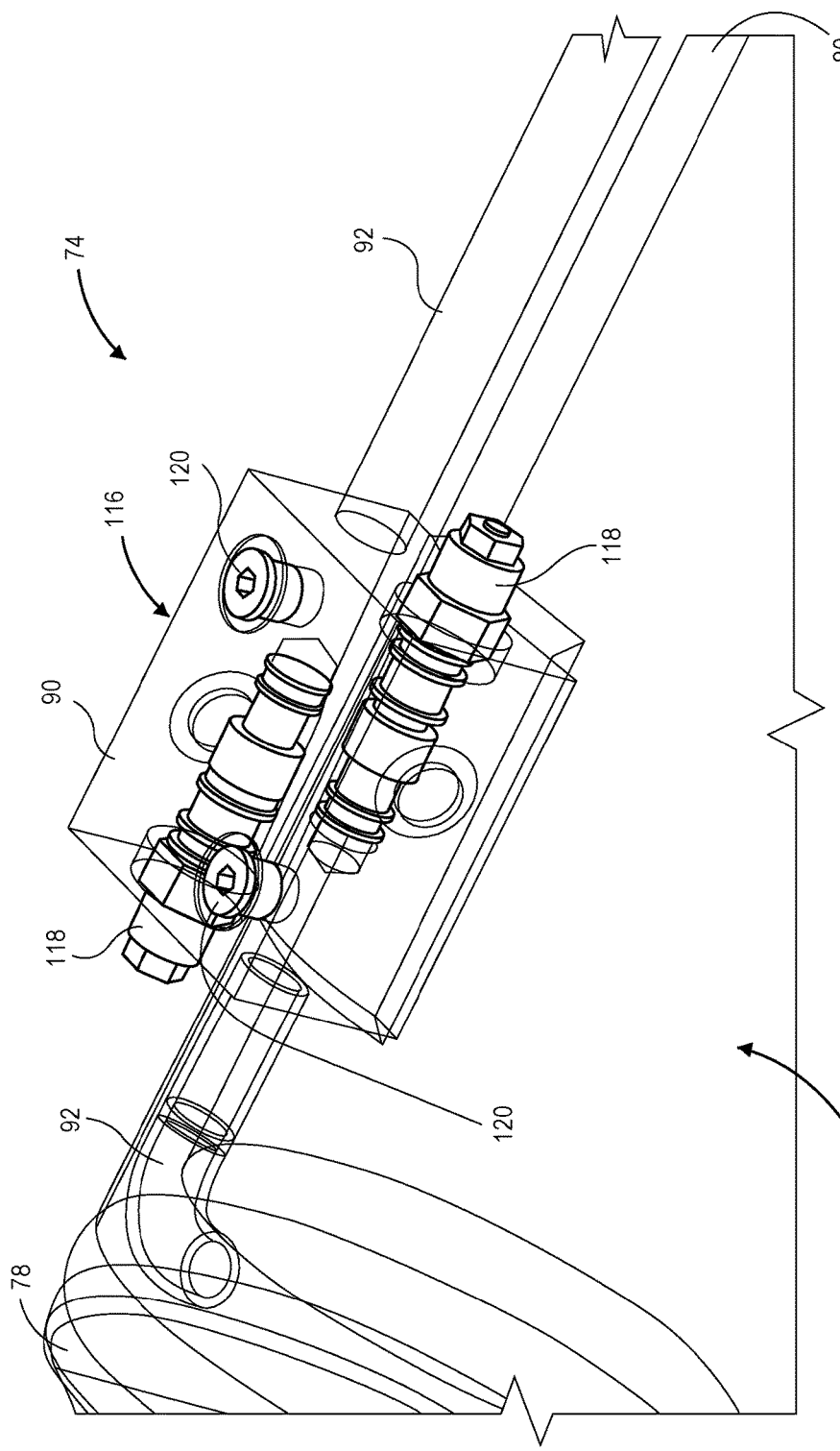
FIG. 7 is a perspective view of a valve mount of the barrel of the position-determining actuator.

In embodiments of the invention, the position-determining actuator 20 (which may include the above-discussed actuator 60) is a hydraulic cylinder, as best illustrated in FIG. 3. The hydraulic cylinder comprises a rod 72 disposed at least partially within a barrel 74, as illustrated in FIG. 3. The rod 72 includes a piston 75 fully disposed within the barrel 74, as best illustrated in FIG. 5. A cap-side void 76 is formed between the piston 75 and the barrel 74 and a cap 78 on the interior side, as best illustrated in FIG. 7. The hydraulic cylinder is elongated by pumping hydraulic fluid into the cap-side void 76 so as to enlarge the cap-side void 76 (and by extension push the rod 72 and piston 75 relative to the barrel 74. The pumping is performed by a pump via hydraulic lines (not illustrated).

Figure 4:
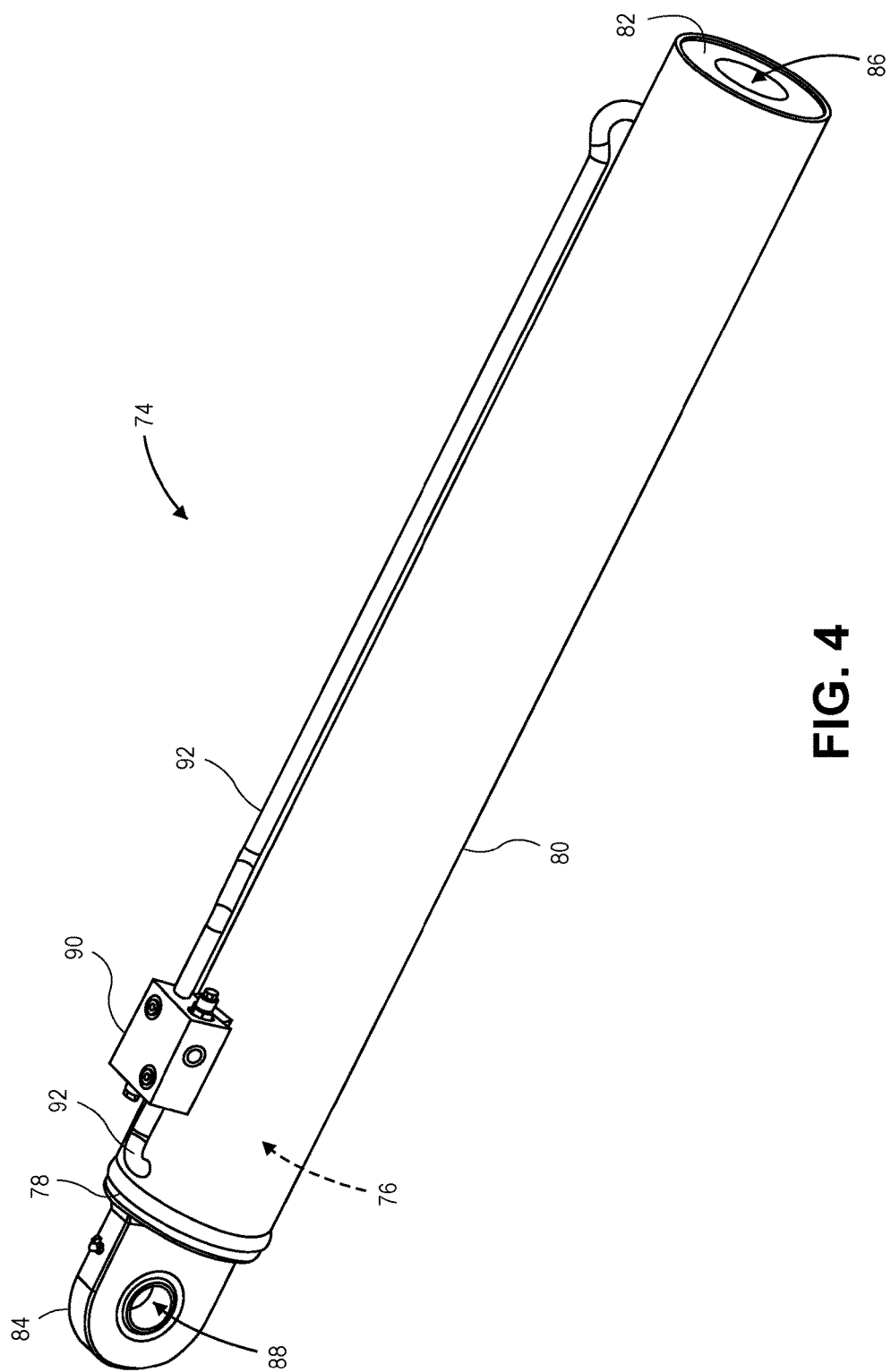
FIG. 4 is a perspective view of a barrel of the position-determining actuator.

An exemplary embodiment of the barrel 74 is illustrated in FIG. 4. The barrel 74 comprises an outer wall 80, the cap 78, a head 82, and a barrel mount 84. The outer wall 80 is generally cylindrical. The cap 78 and the head 82 are each secured to respective ends of the cylindrical wall. The cap 78 is fully enclosing, so as to prevent the leaking or loss of hydraulic fluid therefrom. The head 82 is enclosing save for a rod opening 86. The rod opening 86 is configured to receive the rod 72 therethrough. This allows the rod 72 to be disposed at least partially within the barrel 74 and allow the rod 72 to move relative to the barrel 74. The barrel mount 84 is disposed on or associated with the cap 78. The barrel mount 84 includes a barrel mount opening 88 that is configured to receive a pin, a bar, or other component of the utility vehicle 10. In many instances, the barrel mount 84 is disposed on a static (or relatively static) component of the utility vehicle 10, which is pushed against so as to move another mobile component of the utility vehicle 10. In other embodiments, the barrel 74 may be permanently mounted to another component of the utility platform, such as an interior (not illustrated) of the lower boom section 22.

In some embodiments, the barrel 74 further comprises a valve mount 90 and at least one transfer tube 92, as best illustrated in FIG. 7. The valve mount 90 is associated with, and may be mounted on or a component of, the barrel 74. The transfer tube 92 is disposed between the valve mount 90 and an end of the outer wall 80 of the barrel 74. The transfer tube 92 allows hydraulic fluid to flow to or from the position-determining actuator 20 while the valve is open. At least one valve is disposed within the valve mount 90. The valve is in fluid communication with the transfer tube 92 as well as a hydraulic line (not illustrated). The valve may be a load-holding valve 118 (also known as a counter balance valve). Load-holding valves 118 prevent the boom assembly 14 from drifting down slowly when the valves are not activated. Thus, the boom assembly 14 can remain static under a load.

An exemplary embodiment of the rod 72 is illustrated in FIG. 5. The rod 72 comprises an elongated shaft 94, the cylindrical piston 75, and a rod mount 96. The elongated shaft 94 is disposed between the cylindrical piston 75 and the rod mount 96. The elongated shaft 94 has a smaller cross-sectional area than the cylindrical piston 75 so as to form a rod-side void 98 within the barrel 74 (e.g., bordered by the barrel 74, a rod-side of the piston 75, and the head 82). The piston 75 may include a piston seal, O-rings, a piston nut, a piston guide ring, a piston static seal, or other components (not illustrated) to facilitate the piston 75 moving relative to the barrel 74 in response to the force of hydraulic fluid on the cap side and/or the rod side, as well as to keep the hydraulic fluid from leaking around the piston 75. The rod mount 96 includes a rod mount opening 100 that is configured to receive a pin, a bar, or other component (not illustrated) of the utility vehicle 10. In many instances, the rod mount 96 is disposed on a mobile (or relatively mobile) component of the utility vehicle 10, which is pushed against so as to move the mobile component of the utility vehicle 10. In other embodiments, the rod 72 may be permanently mounted to another component of the utility platform, such as an interior (not illustrated) of the upper boom section 24.

In some embodiments of the invention, the hydraulic cylinder acts as a double acting cylinder (as illustrated in FIG. 3). In embodiments of the invention, the extending or telescoping action is done by the application of hydraulic power to the piston 75 or other portion of the hydraulic cylinder. In a double acting cylinder, the rod 72 is extended by applying hydraulic or pneumatic pressure to the cap-side of the piston 75 (e.g., the cap-side void 76), and the rod 72 is retracted by applying hydraulic or pneumatic pressure to the rod-side of the piston 75 (e.g., the rod-side void 98). In other embodiments, the hydraulic cylinder constitutes a single acting cylinder. In a single acting cylinder, the rod 72 is extended by applying hydraulic or pneumatic pressure to the cap-side of the piston 75, and the rod 72 is retracted by allowing the hydraulic fluid or pneumatic gas to drain from the cap-side void 76.

In other embodiments, the actuator 60 is a pneumatic cylinder, which uses air or another gas in lieu of the hydraulic fluid. As the air or other gas is a fluid, it will produce standing waves and function in a manner similar to the hydraulic fluid, such that the position of the pneumatic cylinder can be determined in a similar manner as the hydraulic cylinders discussed below. It should therefore be appreciated that "hydraulic fluid" may be replaced with "pneumatic gas" in this description.

The position-determining actuator 20 will now be discussed in more detail. In embodiments of the invention, at least one of the below-discussed components is added to an existing actuator 60 to form the position-determining actuator 20. In other embodiments, the position-determining actuator 20 is originally manufactured to be included with the utility vehicle 10. In some embodiments, the utility vehicle 10 may include at least one position-determining actuator 20 and at least one standard actuator 60.

In embodiments of the invention, the position-determining actuator 20 comprises the barrel 74, the rod 72, at least one wave detector 102, and a controller 104. The at least one wave detector 102 is configured so as to detect waves of the hydraulic fluid within the barrel 74. The detection of waves may be performed in any of numerous ways as discussed below, such as in monitoring the pressure or using a microphone. The wave is detected so as to give an indication of the position of the position-determining actuator 20. More specifically, standing waves within the hydraulic fluid may determined from the pressure of the fluid, from sound waves being detected externally, or through some other method. The properties of the standing waves are indicative of a degree of extension of the position-determining actuator 20.

In embodiments of the invention, at least one wave detector 102 is associated with the cap-side void 76 and configured to read fluid pressure of a hydraulic fluid disposed in the cap-side void 76. In some embodiments, at least one wave detector 102 is associated with the rod-side void 98 and configured to read fluid pressure of the hydraulic fluid disposed in the rod-side void 98. Using a first wave detector 102 on the cap-side void 76 and a second wave detector 102 on the rod-side void 98 may be performed so as to double-check calculations, because the extension dimension of the cap-side void 76 is directly and inversely proportional to a change in extension dimension of the rod-side void 98.

In some embodiments, the wave detector 102 is or includes a pressure transducer. A pressure transducer a device that measures pressure of a liquid or gas. Pressure is an expression of the force required to stop a fluid from expanding, and is usually stated in terms of force per unit area. The pressure transducer generates a signal as a function of (or otherwise indicative of) the pressure imposed. The pressure can change over time due to the addition or removal of hydraulic fluid to the void 76,98 (actively or passively), the addition or removal of an external load on the position-determining actuator 20 (directly or indirectly), environmental changes such as temperature.

Figure 8:
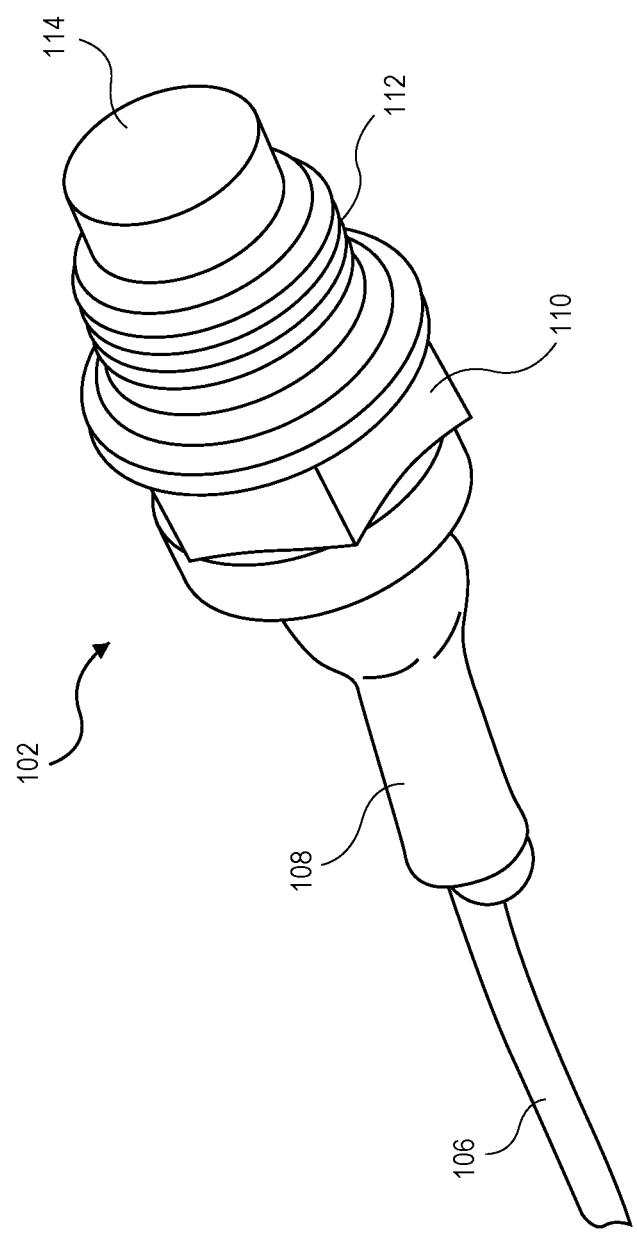
FIG. 8 is a perspective view of a wave detector of the position-determining actuator.

Turning to FIG. 8, a specific exemplary embodiment of the wave detector 102 is shown. In embodiments of the invention, the wave detector 102 is the pressure transducer that comprises a communication wire 106, protective cover 108, a tightening bolt 110, a threaded segment 112, and a sensor face 114. The communication wire 106 sends a signal indicative of a pressure reading to the controller 104 or other computing device (as discussed below). In some embodiments, the wave detector 102 includes a microcontroller for converting, processing, sending, or otherwise manipulating the signal. The protective cover 108 surrounds at least a portion of the communication wire 106. The sensor face 114 includes a force sensor. Because pressure is a measure of force over a unit area, and the surface area of the sensor face 114 is known, pressure can be determined by the force imparted on the sensor face 114 by the fluid. The sensor face 114 detects rapid and minute changes in the pressure, so as to allow the computing device to identify standing waves from the pressure readings.

The tightening bolt 110 allows the wave detector 102 to be secured into a threaded opening (not illustrated) of the barrel 74, the valve mount 90, or other component of the position-determining actuator 20. The threaded segment 112 is complementary to the threaded opening in the position-determining actuator 20. It should be appreciated that the threaded opening may be previously existing and filled with a plug.

In other embodiments, the wave detector 102 may be added to the void 76,98 without use of the threaded segment 112. In these embodiments, an installer may drill a hole into an empty void (e.g., through the outer wall 80 or the cap 78 of the barrel 74), slide the wave detector 102 (or more specifically the sensor face 114) into the void 76,98, and secure the hole with a sealant. In still other embodiments, the wave detector 102 is originally manufactured as an interior component of the barrel 74.

It should be appreciated that the wave detector 102 may be another structure configured to detect a standing wave in the hydraulic fluid. The pressure transducer discussed above is only an exemplary component configured to perform that function. In some other embodiments, the wave detector 102 is a strain gauge secured to the barrel 74, the cap 78, and/or the piston 75. The strain gauge detects standing waves by detecting changes in the strain of the barrel 74. In other embodiments, the wave detector 102 is a microphone. The microphone detects sound waves traveling through the hydraulic fluid. The microphone may be disposed at least partially or fully within the void 76.

As discussed above, the wave detector 102 is utilized by embodiments of the invention to detect standing waves. A standing wave is produced by a vibration, excitation, or other force upon a fluid. The standing wave has a natural frequency based upon the dimensions of the fluid, the speed of sound in the fluid, and other factors. As a cylinder is articulated, natural noise in a hydraulic system will stimulate the formation of waves according to the natural frequencies within the cylinder. Two dominant wavelengths will be established in any fluid-filled actuator. First, the frequency corresponding to the distance between the ends of the void 76,98, and second, the frequency corresponding to the diameter of the actuator (assuming a round actuator, which could be another shape).

Figure 6:
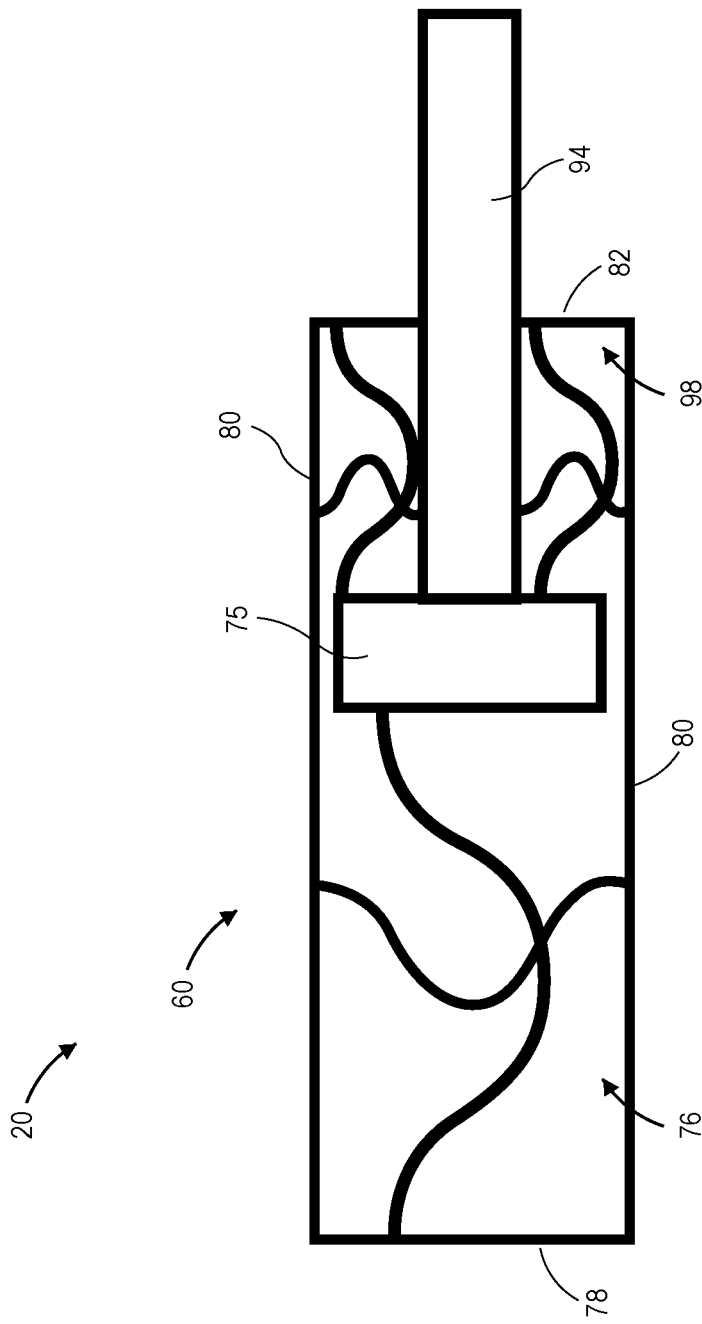
FIG. 6 is a simplified, schematic view of first order standing waves in the position-determining actuator.

FIG. 6 shows a simplified view of a first order standing waves in a hydraulic cylinder. The length of the waves correlates directly to their frequency through the speed of sound in the given medium (e.g., hydraulic fluid). This is governed by an equation that wavelength is equal to speed of sound divided by the frequency. In FIG. 6, the horizontal waves are waves that might be measured to find the extension of the cylinder. The horizontal waves may be referred to as extension standing waves, as they correspond to the extension of the void 76,98. It should be appreciated that the frequency of the extension standing wave will change if the amount of extension changes. Similarly, the vertical waves correspond to the diametric direction. The vertical waves may be referred to as diametric standing waves, as they correspond to the diameter of the void 76,98. It should be appreciated that the diametric standing wave will remain static even with extension of the actuator. A change in the diametric standing wave is indicative of a change in the speed of sound of the hydraulic fluid, such as caused by a change in temperature of the hydraulic fluid. As will be discussed below, embodiments of the invention will identify and differentiation between the extension standing wave and the diametric standing wave so as to determine an extension dimension of the position-determining actuator 20.

As discussed above, these standing waves will be identified and/or analyzed by a controller 104. In some embodiments, the controller 104 is a microcontroller that is within or associated with the wave detector 102. In some embodiments, the controller 104 is a microcontroller that is adjacent to or otherwise associated with each position-determining actuator 20. In still other embodiments, the controller 104 is a central computing device, such as a vehicle control system that controls the other functions of the utility vehicle 10. Due to the computational requirements needed to identify and analyze the standing waves, in some instances a standard microcontroller may be inadequate to timely make the calculations.

In embodiments of the invention, the controller 104 is configured to receive, from the wave detector 102, a pressure reading from within the cap-side void 76, analyze the pressure reading to determine an extension standing wave, and analyze the extension standing wave to determine an extension dimension of the cap-side void 76. The controller 104 performs calculations by performing permutations of Fourier mathematics or otherwise determining dominant frequencies in the pressure reading. For example, using the above discussed equation, the extension dimension may be calculated by dividing the speed of sound in the fluid by the determined frequency.

In some embodiments, determining the extension standing wave is performed by determining a total wave based upon a prolonged pressure reading and extracting, extracting the extension standing wave from the total wave, and extracting a diametric standing wave from the total wave. The diametric standing wave is identified based upon the barrel 74 having a static interior diameter. Thus, in embodiments, two dominant waves are extracted from the total wave. The diametric standing wave is identified based upon the static interior diameter (thus the diametric standing wave is relatively constant for a given position-determining actuator 20). The other dominant wave is then assumed to be the extension standing wave, and the extension dimension is determined based upon the identified extension standing wave. One difficulty may be disregarding the diametric wavelengths from the extension wavelengths, particularly when the extension length is very nearly the same as the diameter. This could potentially be remedied by instrumenting both ends of the cylinder, and reading the end furthest from the diametric frequency.

In some embodiments, of the invention, the diametric standing wave may be analyzed to determine a temperature or other physical characteristic of the hydraulic fluid. As discussed above, the diametric standing wave has a relatively static frequency for a given fluid type. Thus changes in the relatively static diametric standing wave can be analyzed to determine changes in the hydraulic fluid. These changes may affect the extension dimension calculation. For example, a change in temperature of the hydraulic fluid has a corresponding change in the speed of sound of the hydraulic fluid, which has a corresponding change in the frequency of the extension standing wave. Identifying and compensating for these changes provides a more accurate extension dimension. Thus, in embodiments of the invention, the controller 104 determines a temperature of the hydraulic fluid based at least in part on the diametric standing wave. In other embodiments, a separate thermometer may be used to calculate the speed of sound in the hydraulic fluid. Thus, the diameter of the cylinder would be a good reference value, since the acoustic properties of the hydraulic fluid would be the same for both the extension standing wave and the diametric standing wave. In still other embodiments, a cavity (not illustrated) of a known length could be used to provide a baseline frequency corresponding to that known length. In some embodiments, using the constant lengths the acoustic velocity could be calculated for the fluid at any given time directly, without the need to calculate an explicit temperature. As such, the benefits described herein could be achieved without a separate, explicit temperature calculation.

Therefore, in some embodiments, said step of determining the extension dimension is based at least in part on said temperature of the hydraulic fluid. This is done by calculating the speed of sound for the hydraulic fluid based upon the determined temperature, then using the calculated speed of sound for the hydraulic fluid to determine the extension dimension.

In embodiments of the invention, the position-determining actuator 20 further comprises an agitator 116 to induce a wave into the hydraulic fluid. As hydraulic fluid is flowing into or out of the void 76,98, turbulence in the fluid flow naturally creates the standing waves. As the hydraulic fluid stabilizes in the void 76,98, standing waves will diminish and thus be more difficult to detect, and may disappear entirely. An external agitator 116 may increase the detectability of the standing waves and thus allow the controller 104 to perform a more accurate calculation of the extension dimension.

In some embodiments, the agitator 116 induces the wave by imparting a force on an exterior side of the barrel 74. In other embodiments, the agitator 116 is a load-holding valve 118 that is configured to hold a certain extension dimension. In these embodiments, the controller 104 may be further configured to instruct the load-holding valve 118 to activate so as to induce said wave into the hydraulic fluid. These load-holding valves 118 generate broad band noise (turbulence) when oil flows through them, which may be useful in exciting the hydraulic fluid and getting an accurate pressure reading. In some embodiments, the wave detector 102 is inside, adjacent to, or otherwise associated with these load-holding valves 118. In other embodiments, as discussed above, the wave detectors 102 are applied to the barrel 74. In still other embodiments, the wave detectors 102 are secured within a set of test ports 120 shown in FIG. 7.

Embodiments of the invention may comprise computing devices to facilitate the functions and features described herein. The computing devices may comprise any number and combination of processors, controllers, integrated circuits, programmable logic devices, or other data and signal processing devices for carrying out the functions described herein, and may additionally comprise one or more memory storage devices, transmitters, receivers, displays, and/or communication busses for communicating with the various devices of or associated with the utility vehicle 10.

The computing devices may include any device, component, or equipment with a processing element and associated memory elements. The processing element may implement operating systems, and may be capable of executing the computer program, which is also generally known as instructions, commands, software code, executables, applications ("apps"), and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to these memory elements, the server devices may further include file stores comprising a plurality of hard disk drives, network attached storage, or a separate storage network.

The computing devices may specifically include a central controlling system of the utility vehicle 10, a specific actuator controlling system of the utility vehicle 10, mobile communication devices (including wireless devices), work stations, desktop computers, laptop computers, palmtop computers, tablet computers, portable digital assistants (PDA), smart phones, and the like, or combinations thereof. Various embodiments of the computing device may also include voice communication devices, such as cell phones and/or smart phones. In preferred embodiments, the computing device will have an electronic display operable to display visual graphics, images, text, etc. In certain embodiments, the computer program facilitates interaction and communication through a graphical user interface (GUI) that is displayed via the electronic display, this can include the extension dimension, maximum loads available based upon the extension dimension, a visual depiction of the utility vehicle 10 with an accurate representation of the extension dimensions of the various position-determining actuators 20, and other information. The GUI enables the user to interact with the electronic display by touching or pointing at display areas to provide information to the utility vehicle 10.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A position-determining actuator comprising:
   a rod having a piston;
   a barrel at least partially surrounding the piston so as to define a cap-side void and allow the rod to telescope relative to the barrel;
   a wave detector associated with the cap-side void and configured to read fluid pressure of a hydraulic fluid disposed in the cap-side void;
   a controller configured to—
      receive, from the wave detector, a pressure reading from within the cap-side void;
      analyze the pressure reading to determine an extension standing wave; and
      analyze the extension standing wave to determine an extension dimension of the cap-side void.

2. The position-determining actuator of claim 1, wherein determining the extension standing wave is performed by:
   determining a total wave based upon a prolonged pressure reading;
   extracting the extension standing wave from the total wave; and
   extracting a diametric standing wave from the total wave, wherein the diametric standing wave is identified based upon the barrel having a static interior diameter.

3. The position-determining actuator of claim 2, wherein the controller is further configured to:
   determine a temperature of the hydraulic fluid based at least in part on the diametric standing wave,
   wherein determination of the temperature of the hydraulic fluid is further based at least in part on the barrel having the static interior diameter such that variations in the diametric standing wave are correlated to variations in temperature of the hydraulic fluid.

4. The position-determining actuator of claim 3, wherein said step of determining the extension dimension is based at least in part on said temperature of the hydraulic fluid.

5. The position-determining actuator of claim 1, further comprising:
   an agitator 116 configured to induce a wave into the hydraulic fluid.

6. The position-determining actuator of claim 5, wherein the agitator 116 induces the wave by imparting a force on an exterior side of the barrel.

7. The position-determining actuator of claim 5, wherein the agitator 116 is a load-holding valve 118 that is configured to hold a certain extension dimension.

8. The position-determining actuator of claim 7, wherein the controller is further configured to instruct the load-holding valve 118 to activate so as to induce said wave into the hydraulic fluid.

9. A position-determining actuator system comprising:
   a wave detector configured to be secured to a barrel of a hydraulic cylinder,
   wherein the wave detector is configured to read fluid pressure of a hydraulic fluid disposed in a cap-side void of the hydraulic cylinder;
   a controller configured to—
      receive, from the wave detector, a pressure reading from within the cap-side void;

analyze the pressure reading to determine an extension standing wave; and analyze the extension standing wave to determine an extension dimension of the cap-side void.

10. The position-determining actuator system of claim 9, wherein determining the extension standing wave is performed by:

determining a total wave based upon a prolonged pressure reading;

extracting the extension standing wave from the total wave; and extracting a diametric standing wave from the total wave, wherein the diametric standing wave is identified based upon the barrel having a static interior diameter.

11. The position-determining actuator system of claim 10, wherein the controller is further configured to:

determine a temperature of the hydraulic fluid based at least in part on the diametric standing wave, wherein determination of the temperature of the hydraulic fluid is further based at least in part on the barrel having the static interior diameter such that variations in the diametric standing wave are correlated to variations in temperature of the hydraulic fluid, wherein said step of determining the extension dimension is based at least in part on said temperature of the hydraulic fluid.

12. The position-determining actuator system of claim 9, further comprising:

an agitator 116 configured to induce a wave into the hydraulic fluid.

13. The position-determining actuator system of claim 12, wherein the agitator 116 is a load-holding valve 118 that is configured to hold a certain extension dimension, wherein the controller is further configured to instruct the load-holding valve 118 to activate so as to induce said wave into the hydraulic fluid.

14. The position-determining actuator system of claim 9, wherein the wave detector includes— a sensor face 114 configured to be placed in contact with the hydraulic fluid within the void, a communication wire configured to transmit the pressure reading to the controller.

15. The position-determining actuator system of claim 14, wherein the wave detector further includes— a threaded segment configured to be inserted into a threaded hole of the barrel, such that the wave detector can be added to an existing barrel.

* * * * *